United States Patent
Kunitomi et al.

(10) Patent No.: US 10,358,988 B2
(45) Date of Patent: Jul. 23, 2019

(54) INTERNAL COMBUSTION ENGINE

(71) Applicant: KABUSHIKI KAISHA TOYOTA CHUO KENKYUSHO, Nagakute-shi, Aichi-ken (JP)

(72) Inventors: Seiichi Kunitomi, Nagakute (JP); Seiji Yamamoto, Nagakute (JP); Mitsuaki Ohtomo, Nagakute (JP); Hiroshi Miyagawa, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/925,065

(22) Filed: Mar. 19, 2018

(65) Prior Publication Data

US 2018/0274455 A1    Sep. 27, 2018

(30) Foreign Application Priority Data

Mar. 27, 2017 (JP) ................................ 2017-060420
Feb. 14, 2018 (JP) ................................ 2018-023651

(51) Int. Cl.
*F02D 13/02* (2006.01)
*F02D 41/00* (2006.01)
(Continued)

(52) U.S. Cl.
CPC ..... *F02D 13/0226* (2013.01); *F02D 13/0257* (2013.01); *F02D 41/0002* (2013.01); *F02D 41/0007* (2013.01); *F02B 2031/006* (2013.01); *F02D 2041/001* (2013.01); *F02D 2041/002* (2013.01); *F02D 2041/0015* (2013.01); *F02M 26/05* (2016.02); *F02M 26/06* (2016.02); *Y02T 10/18* (2013.01)

(58) Field of Classification Search
CPC ......... F01L 1/344; F01L 1/46; F01L 13/0015; F01L 2800/06; F02B 2031/006; F02D 13/0226; F02D 13/0257; F02D 41/0002; F02D 41/0007; F02D 2041/001; F02D 2041/0015; F02D 2041/002; F02D 2200/602
USPC ...................................... 123/90.15
See application file for complete search history.

(56) References Cited

U.S. PATENT DOCUMENTS

2010/0212619 A1* 8/2010 Murata ................... F01L 1/047
                                                                 123/90.17
2012/0017876 A1* 1/2012 Sawada ................... F01L 1/344
                                                                 123/48 C
(Continued)

FOREIGN PATENT DOCUMENTS

JP    H04-179825 A    6/1992
WO    2011/125208 A1    10/2011

*Primary Examiner* — Jorge L Leon, Jr.
(74) *Attorney, Agent, or Firm* — Oliff PLC (57) ABSTRACT

An internal combustion engine includes a first intake valve, a second intake valve, an accelerator open degree sensor that detects a load state, and an ECU 26 that controls the valve opening timing of the first and second intake valves and an amount of intake gas introduced to a combustion chamber from the first and second intake valves. When a load of a vehicle increases, the ECU reduces the ratio of the amount of intake gas from, among the two or more intake valves, the second intake valve having a later valve opening timing, whereas when the load decreases, the ECU increases the ratio.

8 Claims, 10 Drawing Sheets

(51) Int. Cl.
  *F02M 26/06* (2016.01)
  *F02B 31/00* (2006.01)
  *F02M 26/05* (2016.01)

(56) References Cited

U.S. PATENT DOCUMENTS

| | | | |
|---|---|---|---|
| 2013/0024093 A1* | 1/2013 | Murai | F02D 41/30 701/104 |
| 2013/0042611 A1 | 2/2013 | Kaneko | |
| 2015/0090220 A1* | 4/2015 | Ito | F02D 13/0234 123/346 |

* cited by examiner

INTERNAL COMBUSTION ENGINE

PRIORITY INFORMATION

This application claims priority to Japanese Patent Application Nos. 2017-060420 filed on Mar. 27, 2017 and 2018-023651 filed on Feb. 14, 2018, which are incorporated herein by reference in their entireties.

TECHNICAL FIELD

The present disclosure relates to an internal combustion engine; in particular, to an internal combustion engine which controls valve opening timings of intake valves and the amounts of intake gas from intake ports to a combustion chamber.

BACKGROUND

For internal combustion engines, it is desired to enhance thermal efficiency; in other words, fuel economy. In order to enhance thermal efficiency, internal combustion engines including the following are known: a forced induction device, an exhaust gas recirculation (EGR) system for circulating exhaust gas in a gas intake passage, and a valve timing variable mechanism which opens and closes intake valves of two or more intake ports at different timings.

There are also internal combustion engines combining a forced induction device, an EGR system, and a valve timing variable mechanism. Such internal combustion engines perform control to first introduce EGR gas into a combustion chamber and then fresh gas using the forced induction device (refer to, for example, International Publication No. WO 2011/125208).

An internal combustion engine may combine a first intake port having a strong swirl generating power, a second intake port having a weak swirl generating power, and a valve timing variable mechanism. Such an internal combustion engine is controlled such that when a load is low, the first intake port alone is used to generate a strong swirl in a combustion chamber, whereas when a load is high, the first and the second intake ports are both used to enhance filling efficiency of the combustion chamber with intake gas (for example, refer to JP H04-179825A).

In the internal combustion engine which opens and closes intake valves at different timings, the amount of gas introduced from the valve which is later opened and closed increases. In internal combustion engines, the temperature in a cylinder rises along with an increase in the amount of gas introduced around bottom dead center. A combustion rate, which significantly affects thermal efficiency, highly depends on the temperature. Accordingly, it is necessary to optimally control the temperature in the cylinder in order to maximize thermal efficiency. However, neither International Publication No. WO 2011/125208 nor JP H04-179825A perform such controls.

An object of the present disclosure is to enhance the thermal efficiency of an internal combustion engine by controlling the temperature in a cylinder by controlling the amount of intake gas.

SUMMARY

The present disclosure discloses an internal combustion engine including two or more intake valves, respectively provided for two or more intake ports which are independently connected to a combustion chamber, a load state sensor which senses a load state, and a controller. Based on a sensed result from the load state sensor, the controller controls respective valve opening timings of the two or more intake valves as a first intake valve having an earlier valve opening timing or a second intake valve having a later valve opening timing, and a first ratio which is a ratio of an amount of intake gas introduced to the combustion chamber from the first intake valve to a total amount of intake gas and a second ratio which is a ratio of an amount of intake gas introduced to the combustion chamber from the second intake valve to the total amount of intake gas. When the load sensed by the load state sensor increases, the controller reduces the second ratio, and when the load sensed by the load state sensor decreases, the controller increases the second ratio.

An internal combustion engine according to the present disclosure may further include a valve timing variable mechanism capable of adjusting the valve opening timings of the two or more intake valves.

In an internal combustion engine according to the present disclosure, the controller may adjust, in accordance with a change in the load state, the second ratio by adjusting the amount of intake gas introduced to the combustion chamber from the first intake valve and the amount of intake gas introduced to the combustion chamber from the second intake valve. In an internal combustion engine according to the present disclosure, when the load sensed by the load state sensor increases, the controller may reduce the second ratio by separating the valve opening timing of the second intake valve from an intake bottom dead center by the valve timing variable mechanism.

In an internal combustion engine according to the present disclosure, the controller may perform control to introduce to the combustion chamber intake gas having different compositions from the two or more intake ports.

An internal combustion engine according to the present disclosure may further include a forced induction device which supercharges fresh gas on an upstream side of, among the two or more intake ports, at least the intake port at which the second intake valve is disposed. The forced induction device may be a turbocharger having a wastegate valve. The controller may reduce second ratio when the load sensed by the load state sensor increases, by increasing an opening degree of the wastegate valve to reduce the amount of intake gas introduced to the combustion chamber from the second intake valve and increasing the amount of intake gas introduced to the combustion chamber from the first intake valve.

In an internal combustion engine according to the present disclosure, the intake port at which the first intake valve is disposed and the intake port at which the second intake valve is disposed may form different types of gas flow, swirl or tumble. In an internal combustion engine according to the present disclosure, the intake port at which the second intake valve is disposed may have a shape arranged to introduce intake air to the combustion chamber by a contracted flow.

ADVANTAGES OF THE INVENTION

According to the present disclosure, the temperature in a cylinder can be optimized in accordance with a load.

DESCRIPTION OF EMBODIMENTS

The first embodiment is described by reference to FIGS. 1 to 4. An internal combustion engine 1 according to the first embodiment is a four stroke gasoline engine. The internal combustion engine 1 includes a cylinder 2 in which a piston 3 is slidably provided. A combustion chamber 4 is defined in an upper part inside the cylinder 2 by a top surface and an internal wall of the cylinder 2 and a top surface of the piston 3. A first intake port 5a and a second intake port 5b as well as a first exhaust port 6a and a second exhaust port 6b are connected to the top of the combustion chamber 4. The first intake port 5a and the second intake port 5b are independently connected to the combustion chamber 4 to supply intake gas to the combustion chamber 4. The first exhaust port 6a and the second exhaust port 6b exhaust gas after combustion at the combustion chamber 4. A spark plug 7 which ignites mixed gas in the combustion chamber 4 is also provided at the center of the top of the cylinder 2.

Figure 1:
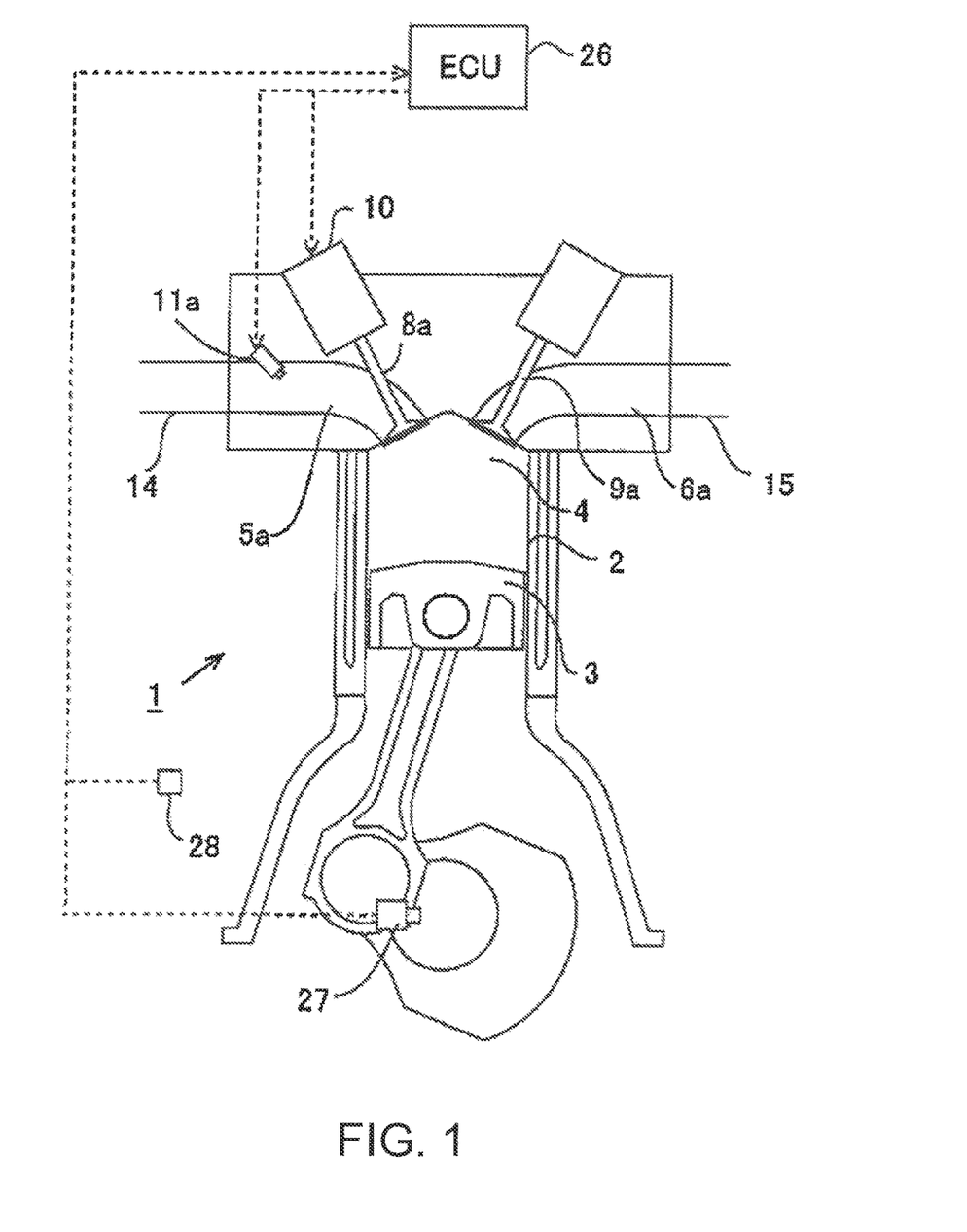
FIG. 1 is a schematic structure diagram of an internal combustion engine according a first embodiment.

An opening of the first intake port 5a to the combustion chamber 4 at the upper surface of the cylinder 2 is opened and closed by a first intake valve 8a. An opening of the second intake port 5b to the combustion chamber 4 at the upper surface of the cylinder 2 is opened and closed by a second intake valve 8b. An opening of the first exhaust port 6a to the combustion chamber 4 at the upper surface of the cylinder 2 is opened and closed by a first exhaust valve 9a. An opening of the second exhaust port 6b to the combustion chamber 4 at the upper surface of the cylinder 2 is opened and closed by a second exhaust valve 9b.

The first intake valve 8a and the second intake valve 8b respectively include valve timing variable mechanisms 10 which respectively change valve opening timings of the first and second intake valves 8a and 8b. The valve timing variable mechanisms 10 are well-known mechanisms which continuously change valve opening durations (amount of lift) of the first and second intake valves 8a and 8b, which are valve opening characteristics of the valves, and also continuously adjust the valve opening timings of the first and second intake valves 8a and 8b, which are other valve opening characteristics of the valves. The valve timing variable mechanisms 10 can set different valve opening timings for the first intake valve 8a and the second intake valve 8b.

Figure 2:
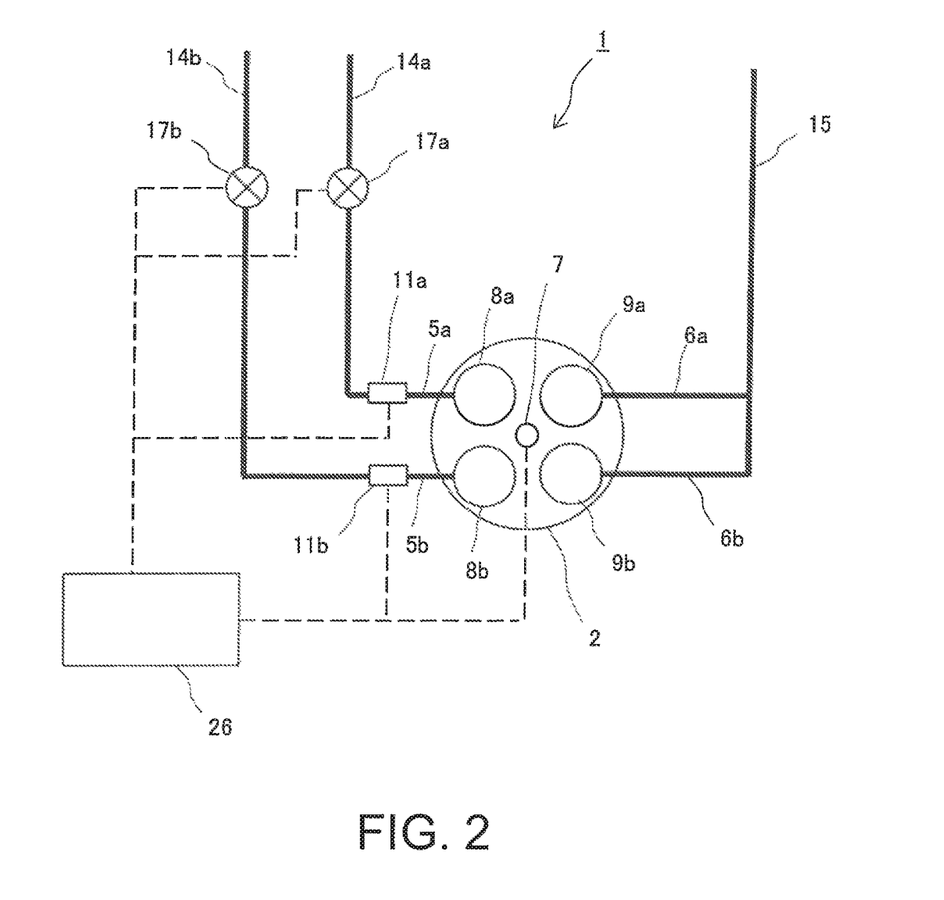
FIG. 2 is a schematic diagram of an intake system and an exhaust system of the internal combustion engine according to the first embodiment.

A first fuel injection valve 11a and a second fuel injection valve 11b are respectively provided for the first intake port 5a and the second intake port 5b such that the first and second fuel injection valves 11a and 11b jet fuel to the intake gas passing through the first and second intake ports 5a and 5b. The first intake port 5a is connected, on the upstream side, to a first intake pipe 14a. The second intake port 5b is connected, on the upstream side, to a second intake pipe 14b. The first intake pipe 14a and the second intake pipe 14b are separated from each other and respectively include a first throttle valve 17a and a second throttle valve 17b. The first and second throttle valves 17a and 17b adjust the amount of intake gas passing through the first and second intake pipes 14a and 14b. Actuators are respectively provided for controlling the opening and closing of the first and second throttle valves 17a and 17b. The first exhaust port 6a and the second exhaust port 6b join together on the downstream side to form a single exhaust pipe 15.

The internal combustion engine 1 is provided with a controller; specifically, an engine control unit (ECU) 26. A crank position sensor 27 and an accelerator open degree sensor 28 (a load state sensor) are electrically connected to the ECU 26 such that output signals from these sensors are input to the ECU 26. The crank position sensor 27 senses a crank angle of the internal combustion engine 1. The accelerator open degree sensor 28 senses an accelerator open degree of a vehicle including the internal combustion engine 1, and thereby senses the load state of the internal combustion engine 1. Also electrically connected to the ECU 26 are other actuators for the valve timing variable mechanisms 10, the first and second fuel injection valves 11a and 11b, and the first and second throttle valves 17a and 17b. Based on the input signals from the crank position sensor 27 and the accelerator open degree sensor 28, the ECU 26 controls the respective actuators of the valve timing variable mechanisms 10, the first and second fuel injection valves 11a and 11b, and the first and second throttle valves 17a and 17b.

Figure 3:
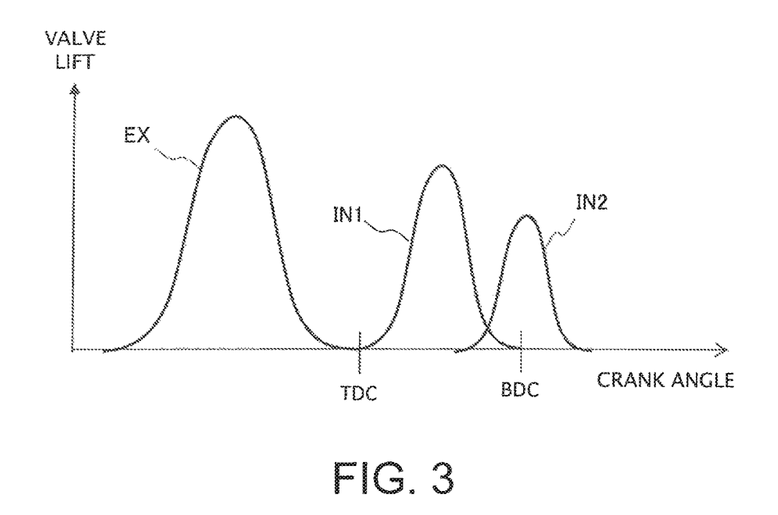
FIG. 3 is a characteristic diagram showing valve opening characteristics of intake valves and exhaust valves of the internal combustion engine according to the first embodiment.

The control by the ECU 26 is described below by reference to FIG. 3. FIG. 3 is a characteristic diagram showing a valve opening timing IN1 of the first intake valve 8a, a valve opening timing IN2 of the second intake valve 8b, and a valve opening timing EX of the first and second exhaust valves 9a and 9b. The horizontal axis represents the crank angle; the vertical axis represents the amount of lift of each valve; TDC represents top dead center; and BDC represents bottom dead center. As shown in FIG. 3, the ECU 26 performs control such that the valve opening timings IN1 and IN2 of the first and second intake valves 8a and 8b are shifted from each other. Specifically, the ECU 26 opens the second intake valve 8b after opening the first intake valve 8a using the valve timing variable mechanisms 10. The valve opening timing IN2 is adjusted such that the second intake valve 8b reaches the maximum open degree at BDC. Although in the present embodiment the ending of the opening period of the first intake valve 8a overlaps with the beginning of the opening period of the second intake valve 8b, these timings do not necessarily overlap each other.

The amount of intake gas is controlled such that the amount of intake gas from the second intake port 5b is larger than the amount of intake gas from the first intake port 5*a*. The amount of intake gas may be adjusted by increasing the amount of valve lift or the open degree of the throttle valve. Alternatively, the pressure of the intake gas may be increased as described in detail below.

Figure 4:
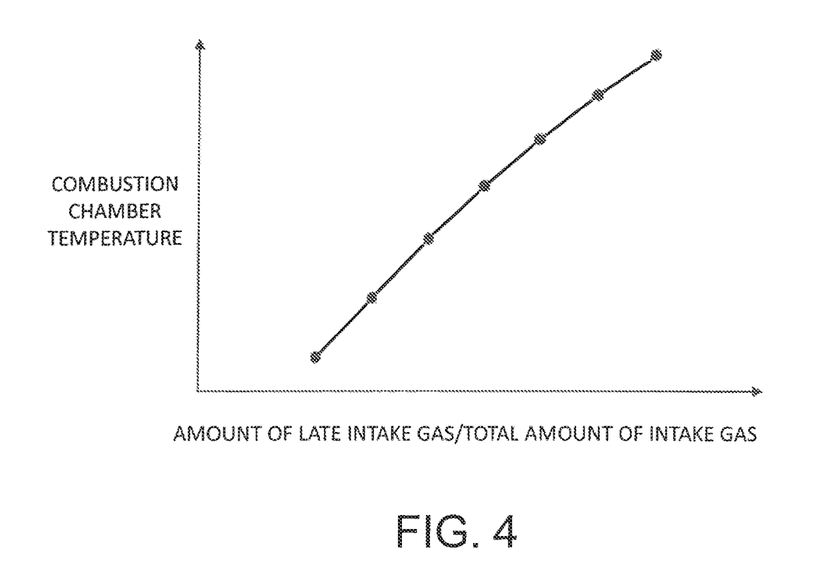
FIG. 4 is a characteristic diagram showing a relationship between the ratio of the amount of late intake gas to the total amount of intake gas and the temperature in a combustion chamber.

By reference to FIG. 4, a description is given of the reasons why the valve opening timing of the second intake valve 8*b* is controlled to be later than the valve opening timing of the first intake valve 8*a* and why the amount of intake gas from the second intake port 5*b* is controlled to be larger than the amount of intake gas from the first intake port 5*a*. FIG. 4 is a characteristic diagram showing a relationship between the temperature in the combustion chamber 4 and the ratio of the amount of late intake gas to the total amount of intake gas to the combustion chamber 4 when the load and the total amount of intake gas are both constant. Such characteristics can be observed by experiments and simulations. As shown in FIG. 4, when the total amount of intake gas is constant, the temperature in the combustion chamber 4 can be raised by increasing the ratio of the amount of late intake gas to the total amount of intake gas to the combustion chamber 4. Accordingly, the ratio of the amount of earlier intake gas to the total amount of intake gas is reduced.

For example, when the total amount of intake gas is assumed to be 4.0 and the amount of intake gas introduced to the combustion chamber 4 from the first intake gas valve 8*a* having an earlier valve opening timing and the amount of intake gas from the second intake gas valve 8*b* having a later valve opening timing are both 2.0, a second ratio which is a ratio of the amount of intake gas introduced to the combustion chamber 4 from the second intake gas valve 8*b* having a later valve opening timing can be increased from 50% to 75% by, while maintaining the total amount of intake gas at 4.0, reducing the amount of intake gas introduced to the combustion chamber 4 from the first intake gas valve 8*a* from 2.0 to 1.0 and increasing the amount of intake gas introduced to the combustion chamber 4 from the second intake gas valve 8*b* from 2.0 to 3.0. As a result, the temperature in the combustion chamber 4 can be raised. The raised temperature in the combustion chamber 4 shortens the combustion period. Accordingly, a first ratio which is a ratio of the amount of intake gas introduced to the combustion chamber 4 from the first intake gas valve 8*a* having an earlier valve opening timing to the total amount of intake gas decreases from 50% to 25%.

Returning to FIG. 3, the timing to introduce gas from the second intake valve 8*b* is described. In order to raise the temperature in the combustion chamber 4, it is desired to introduce a large amount of air around BDC, because no expansion stroke, in other words, no temperature lowering stroke, is applied to the intake gas. Accordingly, in order to raise the temperature in the combustion chamber 4, it is preferable to open the second intake valve 8*b* for a later intake around BDC, or more preferably at BDC.

Then, the intake gas is compressed, raising the temperature in the combustion chamber 4. Because combustion is performed in such a state, the combustion is efficiently performed, resulting in an increased combustion rate. In other words, the combustion period is shortened, increasing the degree of constant volume combustion.

A combustion state changes in accordance with the load state. In particular, when a large amount of air is introduced to the combustion chamber 4 at a late timing, while knocking is unlikely to occur when a load is low, knocking is likely to occur when a load is high. Accordingly, the ECU 26 senses the load state of the internal combustion engine 1 based on an input signal showing the detection result from the accelerator open degree sensor 28. In the low load state, the second ratio which is a ratio of the amount of intake gas introduced to the combustion chamber 4 from the second intake valve 8*b* having a later valve opening timing to the total amount of intake gas is increased to raise the temperature in the combustion chamber 4 in order to increase the combustion rate. In contrast, in the high load state, the second ratio which is a ratio of the amount of intake gas introduced to the combustion chamber 4 from the second intake valve 8*b* having a later valve opening timing to the total amount of intake gas is reduced to be lower than the second ratio in the low load state so as to restrict knocking.

Figure 5:
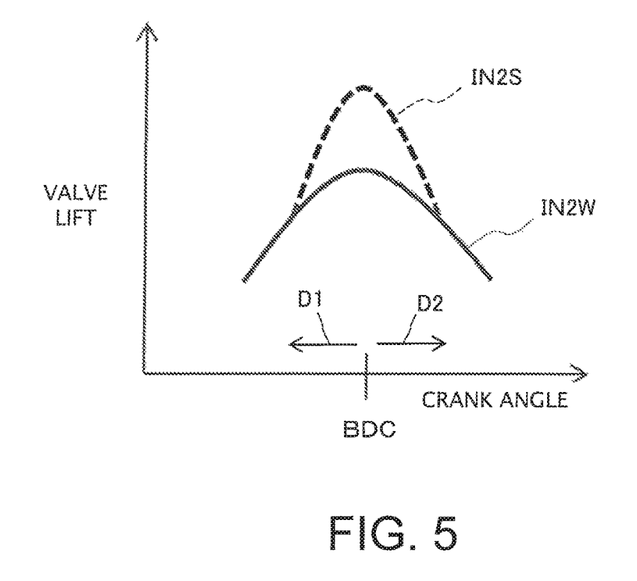
FIG. 5 is a characteristic diagram showing valve opening characteristics of a second intake valve.

There is described a specific example of control which adjusts the first ratio indicating the ratio of the amount of intake gas from the first intake valve 8*a* having an earlier valve opening timing to the total amount of the intake gas and the second ratio indicating the ratio of the amount of intake gas from the second intake valve 8*b* having a later valve opening timing to the total amount of the intake gas. As shown in FIG. 5, at BDC in the low load state, the width of the cam in the rotation direction and the height of the cam used to adjust the valve opening period and the valve opening timings of the second intake valve 8*b* are adjusted by the valve timing variable mechanism 10 such that the cam width is narrowed and the cam height is raised. In other words, the open valve characteristics of the second intake valve 8*b* are set to be rapid as shown by the curve IN2S in FIG. 5. In this way, in the low load state, the amount of valve lift of the second intake valve 8*b* when opened becomes large. In contrast, in the high load state, the width of the cam in the rotation direction and the height of the cam which drives the second intake valve 8*b* are adjusted such that the cam width is enlarged and the cam height is lowered. In other words, the open valve characteristics of the second intake valve 8*b* are set to be gradual as shown by the curve IN2W in FIG. 5. In this way, in the high load state, the amount of valve lift of the second intake valve 8*b* when opened becomes small.

When the load state of the internal combustion engine 1 is changed from an intermediate load state between the low and high load states to the low load state, the ECU 26 performs control described below. The total amount of intake gas in the intermediate load state is assumed to be 4.0. It is further assumed that, in the intermediate load state, the amount of intake gas from the first intake valve 8*a* and the amount of intake gas from the second intake valve 8*b* are equal to each other at 2.0. In this case, the second ratio is 0.5. When the load state changes to the low load state, the ECU 26 perform control to reduce the total amount of intake gas from 4.0 to 2.0 and increase the second ratio to be larger than the current ratio. For example, the ECU 26 controls to increase the second ratio to be larger than the second ratio in the intermediate load state by reducing the amount of intake gas from the second intake valve 8*b* from 2.0 to 1.2 using the second throttle valve 17*b* and reducing the amount of intake gas from the first intake valve 8*a* from 2.0 to 0.8 using the first throttle valve 17*a*, resulting in the second ratio in the low load state being 1.2/2.0=0.6.

When the load state changes from the intermediate load state with the total amount of intake gas at 4.0 to the low load state with the total amount of intake gas at 3.0, the ECU 26 may perform control to increase the second ratio from 0.5 in the intermediate load state by maintaining the amount of intake gas from the second intake valve 8*b* at 2.0 without changing the open degree of the second throttle valve 17*b* and reducing the amount of intake gas from the first intake valve 8*a* from 2.0 to 1.0 using the first throttle valve 17*a*, resulting in the second ratio in the low load state being 2.0/3.0=0.66. The valve lift of the first intake valve 8a and the second intake valve 8b may be changed in accordance with the amount of intake gas of each valve.

When the load state changes from the intermediate load state with the total amount of intake gas at 4.0 to the high load state with the total amount of intake gas at 6.0, the ECU 26 performs control described below. In the intermediate load state, the amount of intake gas from the first intake valve 8a and the amount of intake gas from the second intake valve 8b are equal to each other at 2.0. When the load state changes to the high load state, the ECU 26 controls to increase the total amount of intake gas from 4.0 to 6.0 and reduce the second ratio to be lower than the second ratio in the intermediate load state. For example, the ECU 26 may perform control to reduce the second ratio in the high load state to be lower than the second ratio in the intermediate load state by increasing the amount of intake gas from the second intake valve from 2.0 to 2.4 using the second throttle valve 17b and increasing the amount of intake gas from the first intake valve 8a from 2.0 to 3.6 using the first throttle valve 17a, resulting in the second ratio in the high load state being 2.4/6.0=0.4.

When the load state changes from the intermediate load state with the total amount of intake gas at 4.0 to the high load state with the total amount of intake gas at 5.0, the ECU 26 may perform control to reduce the second ratio in the high load state to be lower than the second ratio in the intermediate load state by maintaining the amount of intake gas from the second intake valve 8b at 2.0 without changing the open degree of the second throttle valve 17b and increasing the amount of intake gas from the first intake valve 8a from 2.0 to 3.0 using the first throttle valve 17a, resulting in the second ratio in the high load state being 2.0/5.0=0.4. The valve lift of the first intake valve 8a and the second intake valve 8b may be changed in accordance with the amount of intake gas of each valve.

When the load increases, the ECU 26 separates the top of the cam of the second intake valve 8b from BDC using the valve timing variable mechanism 10. Specifically, as shown by the arrows D1 and D2 in FIG. 5, the ECU 26 may shift the top of the cam of the second intake valve 8b to be separated (placed away) from BDC. The amount of intake gas of the second intake valve 8b reaches the maximum when the top of the cam is at BDC and decreases when the top of the cam is shifted from BDC. When the load is constant, because the total amount of intake gas is constant, the second ratio decreases from the second ratio in the intermediate load state when the amount of intake gas from the second intake valve 8b decreases.

Under the above described control by the ECU 26, when the load state is low, the combustion rate can be increased by raising the temperature in the combustion chamber 4, whereas when the load state is high, knocking can be reduced by restricting the temperature rise in the combustion chamber 4.

When adjusting the amount of intake gas in accordance with the applied load, the adjustment can be made continuously or in a stepwise manner from a low load to a high load.

As a variation of the first embodiment, an embodiment using the first and second intake ports 5a and 5b having different shapes is described below. Specifically, described below is an embodiment performing stratified combustion in the combustion chamber 4 by using different intake flows from the first intake port 5a and the second intake port 5b.

Figure 6:
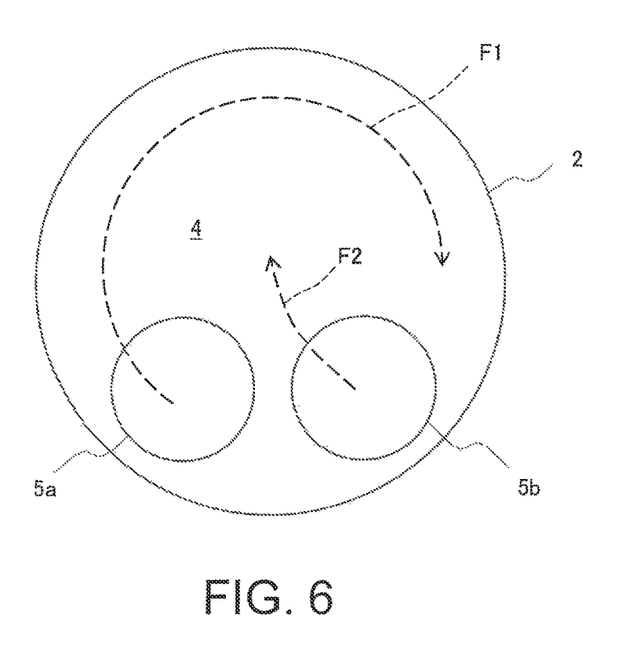
FIG. 6 is a schematic diagram showing flows of intake gas introduced to the combustion chamber.

As shown in FIG. 6, the first intake port 5a is a helical port which creates a swirl flow F1 in the combustion chamber 4. The second intake port 5b has a shape which creates a flow F2 directed towards the center of the swirl created by the first intake port 5a. The second intake port 5b may have a shape which introduces a tumble flow.

Excess air for dilution is introduced through the first intake port 5a. This excess air creates swirl in the combustion chamber 4 to be directed towards a bottom portion of the combustion chamber 4. Then, an air-fuel mixture having a stoichiometric mixture ratio is introduced from the second intake port 5b. This intake gas is directed to the vicinity of the spark plug 7 above the excess air in the combustion chamber 4.

In this embodiment, the intake gas to the combustion chamber 4 from the first intake port 5a and the intake gas from the second intake port 5b have different compositions. Specifically, excess air is introduced from the first intake port 5a, whereas an air-fuel mixture is introduced from the second intake port 5b. In this way, the air-fuel mixture introduced from the second intake port 5b can achieve a stratification distribution because of short diffusion time. When an air-fuel mixture stratification is achieved near the spark plug 7, stable combustion can be performed even with excess air being introduced. In other words, because a large amount of excess air can be introduced, fuel economy can be enhanced by the diluted combustion.

Figure 7:
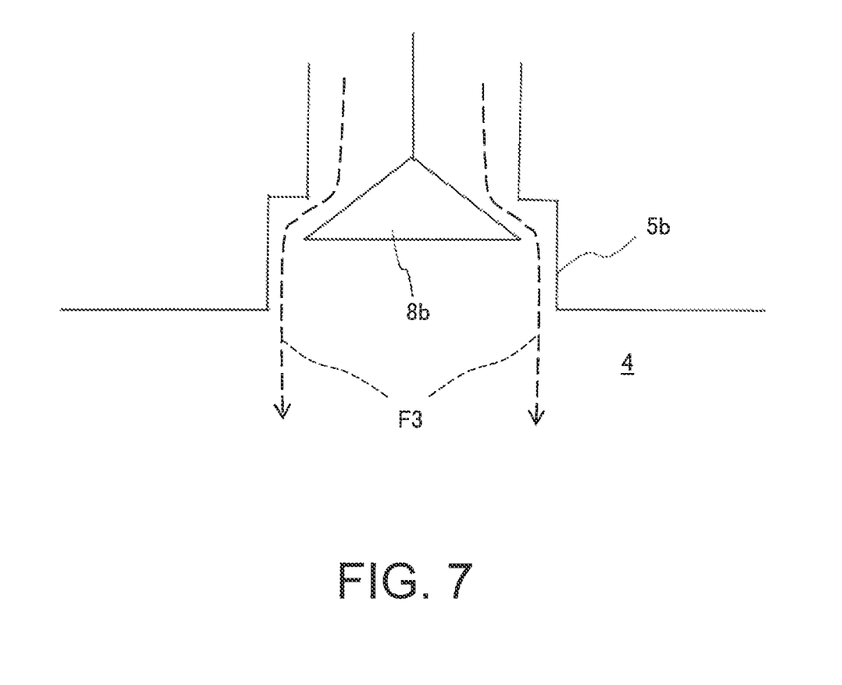
FIG. 7 is a schematic diagram showing a flow of intake gas introduced to the combustion chamber by a contracted flow.

As shown in FIG. 7, the second intake port 5b may be a contracted flow introduction port. Specifically, the shape of the second intake port 5b near the outlet is arranged and the second intake valve 8b is provided such that the flow of intake gas to the combustion chamber 4 from the second intake port 5b forms a contracted flow F3 by providing a step portion near the outlet of the second intake port 5b. Such a contracted flow introduction port can control the flow of intake gas introduced from the second intake port 5b to the combustion chamber 4, achieving a desired flow of intake gas in the combustion chamber 4.

Figure 8:
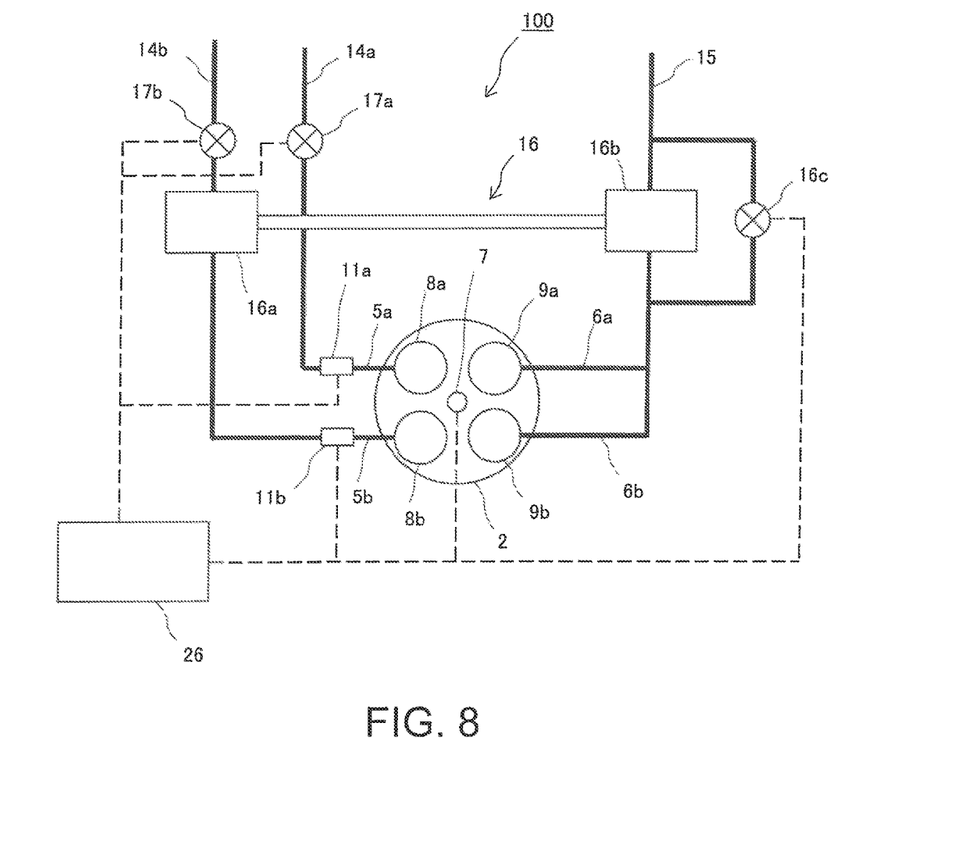
FIG. 8 is a schematic diagram of an intake system and an exhaust system of an internal combustion engine according to a second embodiment.

A second embodiment is described below by reference to FIG. 8. The second embodiment is configured such that an internal combustion engine 100 includes a turbocharger (forced induction device) 16. Because the configurations other than the turbocharger 16 are identical to those of the first embodiment, their descriptions are omitted.

A compressor 16a of the turbocharger 16 is provided along the second intake pipe 14b. A turbine 16b of the turbocharger 16 is provided along the exhaust pipe 15. The turbocharger 16 is a forced induction device which rotates the turbine 16b using exhaust gas energy passing through the exhaust pipe 15 and drives the compressor 16a using the rotational force of the turbine 16b to supply fresh gas. The turbine 16b includes a wastegate valve 16c which adjusts the amount of exhaust gas flow into the turbine 16b. The wastegate valve 16c is controlled by the ECU 26.

The second throttle valve 17b is provided for the second intake pipe 14b on the upstream side of the compressor 16a. The second throttle valve 17b adjusts the amount of fresh gas flowing through the second intake pipe 14b. An intercooler (not shown) is provided for the second intake pipe 14b on the downstream side of the compressor 16a. The intercooler cools the fresh gas passing through the second intake pipe 14b by exchanging heat with external air.

In the internal combustion engine 100, because of the turbocharger 16, the amount of intake gas from the second intake valve 8b is larger than the amount of intake gas from the first intake valve 8a. Specifically, when the load is low, the second ratio is controlled to be larger than the second ratio when the load is high by increasing the amount of intake gas from the second intake valve 8b with supercharging by the turbocharger 16 and reducing the amount of intake gas from the first intake valve 8a. In contrast, when the load is high, the driving of the compressor 16a is restricted by increasing the amount of opening of the wastegate valve 16c to reduce the amount of exhausted gas flow into the turbine 16b. In this way, the second ratio is controlled to be lower than the second ratio in the low load state by controlling so as not to increase the amount of intake gas from the second intake valve 8b and to increase the amount of intake gas from the first intake valve 8a. The control of the amount of intake gas from the first intake valve 8a and the second intake valve 8b when the load state changes from the intermediate load state to the low load state or to the high load state is identical to the above control described with reference to FIG. 5 except for the adjustment of the amount of intake gas from the second intake valve 8b using the wastegate valve 16c.

As described above, use of the turbocharger 16 can raise the temperature in the combustion chamber 4 by increasing the second ratio when the load is low, achieving a higher combustion rate and thereby a shorter combustion period. As a result, the thermal efficiency of the internal combustion engine 100 can be enhanced.

Figure 9:
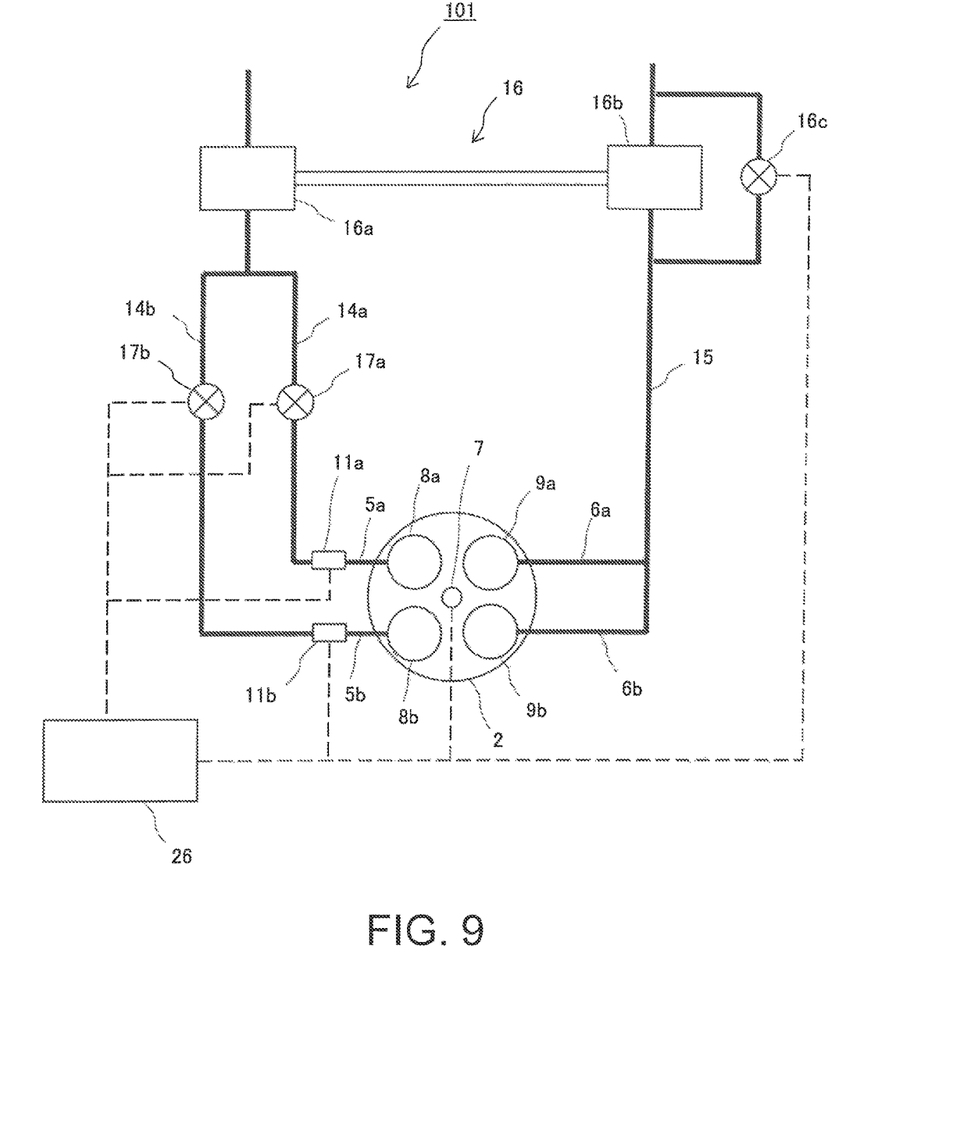
FIG. 9 is a schematic diagram of an intake system and an exhaust system of a variation of the internal combustion engine according to the second embodiment.

As shown in FIG. 9, in an internal combustion engine 101, the first and second intake pipes 14a and 14b may merge on the upstream side into a single pipe along which the compressor 16a of the turbocharger 16 may be provided. In this case, similarly to the above control described with reference to FIG. 5, when the load increases, the second ratio is reduced by controlling the amount of intake gas from the second intake valve 8b and the first intake valve 8a by adjusting the open degree of the second throttle valve 17b and the first throttle valve 17a. Although the turbocharger 16 is used as a forced induction device in the second embodiment, a supercharger may be used in place of the turbocharger 16.

Figure 10:
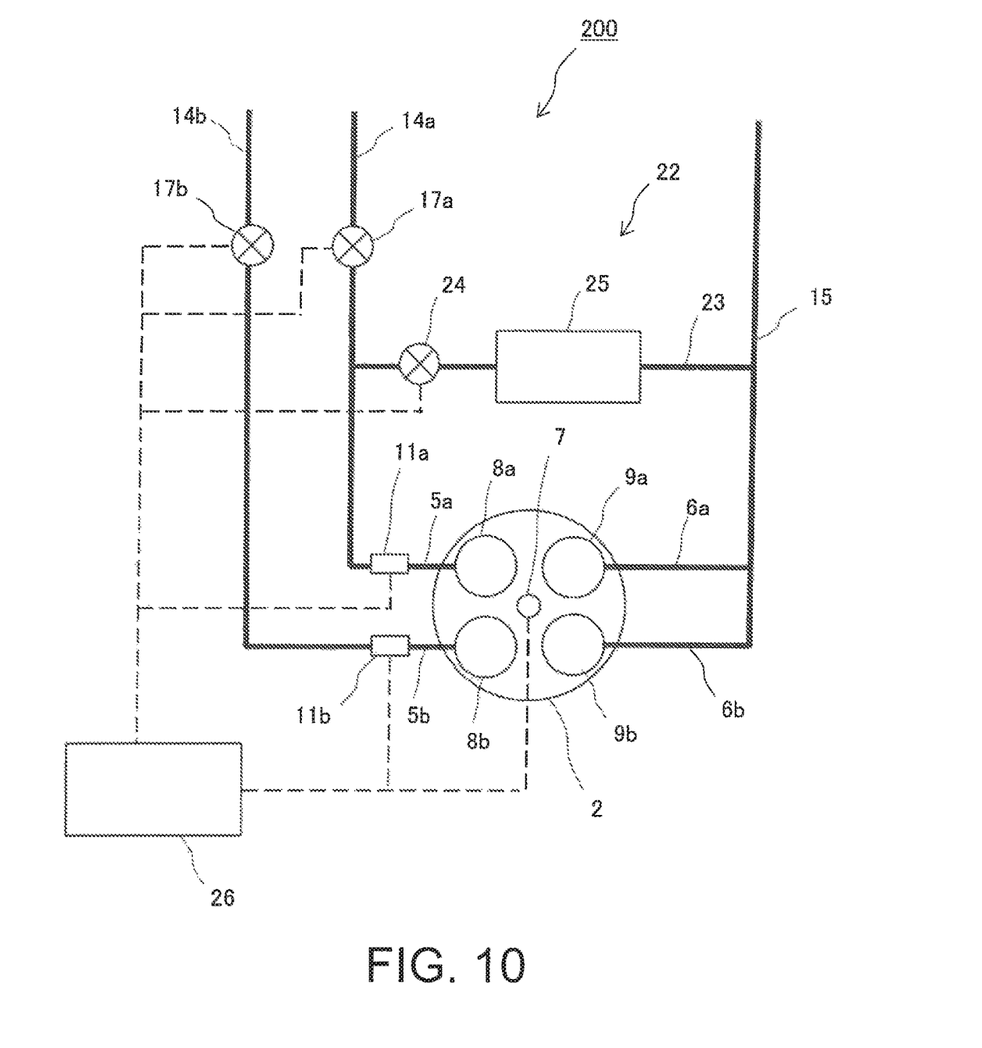
FIG. 10 is a schematic diagram of an intake system and an exhaust system of an internal combustion engine according to a third embodiment.

A third embodiment is described below by reference to FIG. 10. The third embodiment is configured such that an internal combustion engine 200 includes an exhaust gas recirculation (EGR) system 22. Because the configurations other than the EGR system 22 are identical to those of the first embodiment, their descriptions are omitted.

The EGR system 22 includes an EGR path 23, an EGR valve 24, and an EGR cooler 25. One end of the EGR path 23 is connected to the exhaust pipe 15. The other end of the EGR path 23 is connected to the first intake port 5a via the first intake pipe 14a. The EGR system 22 circulates EGR gas, which is part of the exhausted gas, to the first intake port 5a from the exhaust pipe 15 of the internal combustion engine 200 by flowing the EGR gas through the EGR path 23.

The EGR valve 24 and the EGR cooler 25 are disposed along the EGR path 23. The EGR valve 24 is connected to and controlled by the ECU 26. The EGR valve 24 adjusts the amount of EGR gas introduced to the first intake port 5a from the exhaust pipe 15 via the EGR path 23. The EGR cooler 25 cools the EGR gas flowing through the EGR path 23 by exchanging heat with engine cooling water.

In the internal combustion engine 200 according to the third embodiment, the EGR gas is first introduced to the combustion chamber 4 from the first intake port 5a. Then, an air-fuel mixture is introduced from the second intake port 5b. In this way, stable combustion can be obtained, because a mixture stratification can be achieved near the spark plug 7. As a result, the temperature in the combustion chamber 4 can be raised, enhancing the thermal efficiency of the internal combustion engine 200. Such stable combustion can increase the amount of EGR gas supply.

In the internal combustion engine 200 according to the third embodiment, the composition of the intake gas introduced to the combustion chamber 4 from the first intake port 5a differs from the composition of the intake gas from the second intake port 5b. Specifically, the EGR gas is introduced from the first intake port 5a, whereas an air-fuel mixture is introduced from the second intake port 5b. In performing combustion by introducing the EGR gas to the combustion chamber 4, because a stratified combustion is performed to stratify the EGR gas and the air-fuel mixture in the combustion chamber 4, the amount of the EGR gas supply to the combustion chamber 4 can be increased. The stratified combustion can reduce nitrogen oxides (NOx) in the exhausted gas and enhance fuel economy.

Figure 11:
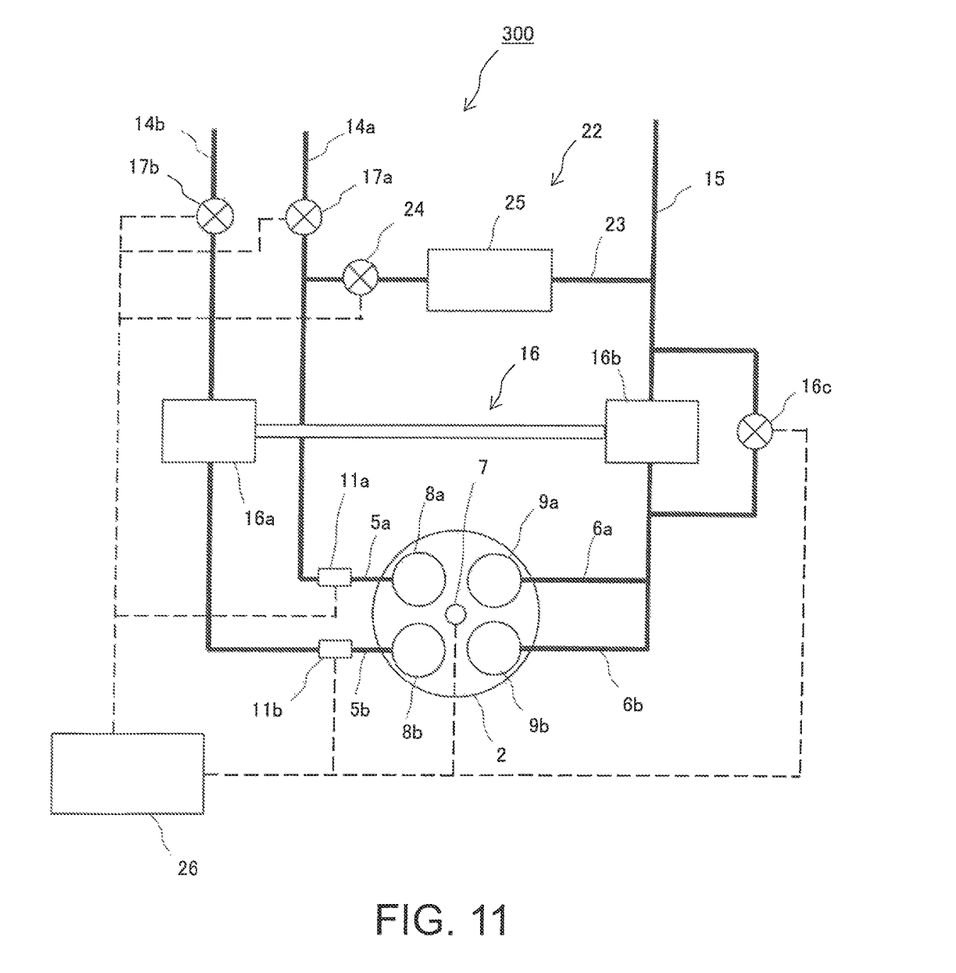
FIG. 11 is a schematic diagram of an intake system and an exhaust system of an internal combustion engine according to a fourth embodiment.

A fourth embodiment is described below by reference to FIG. 11. An internal combustion engine 300 according to the fourth embodiment combines the turbocharger 16 in the second embodiment and the EGR system 22 in the third embodiment. As shown in FIG. 11, the compressor 16a of the turbocharger 16 is disposed along the second intake pipe 14b and the EGR valve 24 of the EGR system 22 is connected to the first intake port 5a via the first intake pipe 14a.

Figure 12:
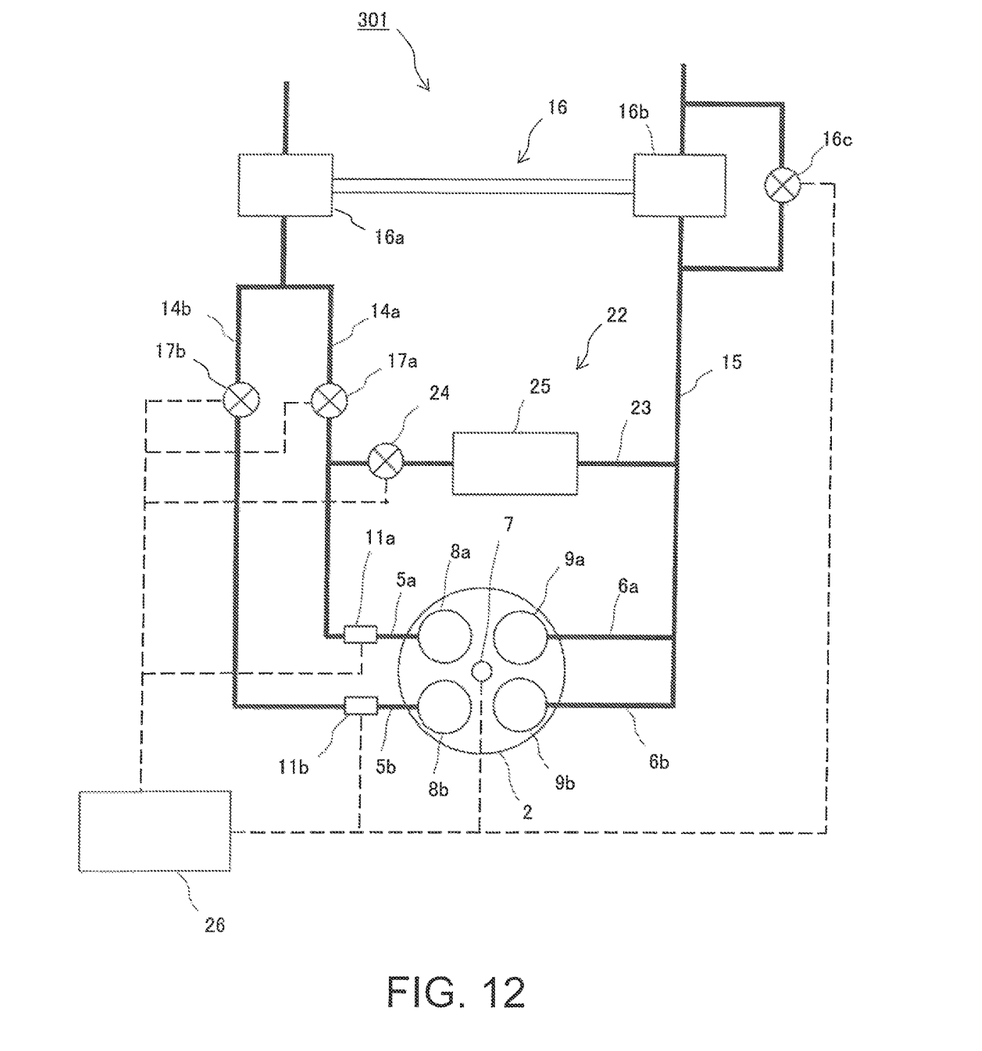
FIG. 12 is a schematic diagram of an intake system and an exhaust system of a variation of the internal combustion engine according to the fourth embodiment.

As shown in FIG. 12, an internal combustion engine 301 may be configured by disposing the compressor 16a of the turbocharger 16 on the upstream side of the first and second throttle valves 17a and 17b, and connecting the EGR valve 24 of the EGR system 22 to the first intake port 5a via the first intake pipe 14a. As shown in FIGS. 11 and 12, the control when using the internal combustion engines 300 and 301 is similar to the control used for the second and third embodiments. In the fourth embodiment, advantages of both the turbocharger 16 and the EGR system 22 can be achieved. It should be noted that although a high pressure loop (HPL) type in which exhausted air is divided into flows from the upstream side of the turbine 16b of the exhaust pipe 15 is used for the above-described EGR system 22, a low pressure loop (LPL) type in which exhausted air is divided into flows from downstream side of the turbine 16b of the exhaust pipe 15 may be used.

The invention claimed is:

1. An internal combustion engine comprising:
a plurality of intake valves, respectively provided for a plurality of intake ports which are independently connected to a combustion chamber;
a load state sensor which senses a load state of the engine;
a controller which controls, based on a sensed result from the load state sensor:
respective valve opening timings of the plurality of intake valves such that a first intake valve of the plurality of intake valves has an earlier valve opening timing or a second intake valve of the plurality of intake valves has a later valve opening timing,
a first ratio which is a ratio of an amount of intake gas introduced to the combustion chamber from the first intake valve to a total amount of intake gas, and
a second ratio which is a ratio of an amount of intake gas introduced to the combustion chamber from the second intake valve to the total amount of intake gas; and
a turbocharger having a wastegate valve, the turbocharger supercharging fresh gas on an upstream side of at least the second intake valve, wherein:
when the load state sensed by the load state sensor increases, the controller reduces the second ratio by increasing an opening degree of the wastegate valve to reduce the amount of intake gas introduced to the combustion chamber from the second intake valve and increasing the amount of intake gas introduced to the combustion chamber from the first intake valve, and when the load state sensed by the load state sensor decreases, the controller increases the second ratio.

2. The internal combustion engine according to claim 1, further comprising:
a valve timing variable mechanism configured to adjust the valve opening timings of the plurality of intake valves.

3. The internal combustion engine according to claim 2; wherein the controller adjusts, in accordance with a change in the sensed load state, the second ratio by adjusting the amount of intake gas introduced to the combustion chamber from the first intake valve and the amount of intake gas introduced to the combustion chamber from the second intake valve.

4. The internal combustion engine according to claim 2; wherein when the load state sensed by the load state sensor increases, the controller reduces the second ratio by separating the valve opening timing of the second intake valve from an intake bottom dead center by the valve timing variable mechanism.

5. The internal combustion engine according to claim 1; wherein the controller adjusts, in accordance with a change in the sensed load state, the second ratio by adjusting the amount of intake gas introduced to the combustion chamber from the first intake valve and the amount of intake gas introduced to the combustion chamber from the second intake valve.

6. The internal combustion engine according to claim 1; wherein the controller performs control to introduce to the combustion chamber intake gas having different compositions from the plurality of intake ports.

7. The internal combustion engine according to claim 1, wherein the intake port at which the first intake valve is disposed forms one of a swirl gas flow and a tumble gas flow, and the intake port at which the second intake valve is disposed forms a remaining one of the swirl gas flow and the tumble gas flow.

8. The internal combustion engine according to claim 1, wherein the intake port at which the second intake valve is disposed has a shape arranged to introduce intake air to the combustion chamber by a contracted flow.

* * * * *